US008834130B2

(12) United States Patent
Fuglsang et al.

(10) Patent No.: US 8,834,130 B2
(45) Date of Patent: Sep. 16, 2014

(54) WIND TURBINE BLADE WITH AN AUXILIARY AIRFOIL

(76) Inventors: Peter Fuglsang, Vejle (DK); Stefano Bove, Lunderskov (DK)

( * ) Notice: Subject to any disclaimer, the term of this patent is extended or adjusted under 35 U.S.C. 154(b) by 953 days.

(21) Appl. No.: 12/935,424

(22) PCT Filed: Apr. 2, 2009

(86) PCT No.: PCT/EP2009/053941
§ 371 (c)(1),
(2), (4) Date: Sep. 29, 2010

(87) PCT Pub. No.: WO2009/121927
PCT Pub. Date: Oct. 8, 2009

(65) Prior Publication Data
US 2011/0020128 A1 Jan. 27, 2011

(30) Foreign Application Priority Data

Apr. 2, 2008 (EP) .................................... 08388014

(51) Int. Cl.
*F03B 3/12* (2006.01)
*F03D 1/06* (2006.01)
(52) U.S. Cl.
CPC ......... *F03D 1/0675* (2013.01); *F05B 2240/301* (2013.01); *F05B 2240/40* (2013.01); *F05B 2240/31* (2013.01); *Y02E 10/721* (2013.01); *F05B 2230/80* (2013.01)
USPC ......... 416/248; 416/203; 416/241 R; 416/239
(58) Field of Classification Search
USPC ................... 416/23, 146 R, 203, 241 R, 248
See application file for complete search history.

(56) References Cited

U.S. PATENT DOCUMENTS 6,142,425 A * 11/2000 Armanios et al. ............ 244/207
6,705,838 B1 * 3/2004 Bak et al. ...................... 416/243
(Continued)

FOREIGN PATENT DOCUMENTS

CA 2 425 447 A1 10/2004
DE 100 03 385 A1 8/2001
(Continued)

*Primary Examiner* — Ninh H Nguyen
(74) *Attorney, Agent, or Firm* — Nath Goldberg & Meyer; Jerald L. Meyer

(57) ABSTRACT

A blade for a rotor of a wind turbine having a substantially horizontal rotor shaft, the rotor comprising a hub, from which the blade extends substantially in a radial direction when mounted to the hub. The blade comprises a main blade part having a profiled contour comprising a pressure side and a suction side as well as a leading edge and a trailing edge with a chord extending between the leading edge and the trailing edge. The profiled contour generates a lift when being impacted by an incident airflow. The profiled contour is divided in the radial direction into a root region with a substantially circular or elliptical profile closest to the hub, the substantially circular or elliptical profile having a diameter, an airfoil region with a lift generating profile furthest away from the hub, and a transition region between the root region and the airfoil region. The profile of the transition region gradually changes in the radial direction from the circular or elliptical profile of the root region to the lift generating profile of the airfoil region. The blade further comprises a first auxiliary airfoil having a first pressure side and a first suction side as well as a first chord extending between a first leading edge and a first trailing edge. The first chord has a length that is 75% or less of the diameter of the substantially circular or elliptical profile in the root region and the first auxiliary airfoil is arranged so that it extends in the radial direction along at least a part of the root region of the main blade part with a distance there between.

16 Claims, 6 Drawing Sheets

(56) References Cited

U.S. PATENT DOCUMENTS

| | | | |
|---|---|---|---|
| 6,840,741 B1 * | 1/2005 | Wake et al. | 416/227 A |
| 2007/0025858 A1 * | 2/2007 | Driver et al. | 416/229 R |
| 2007/0041829 A1 * | 2/2007 | Bonnet | 415/119 |

FOREIGN PATENT DOCUMENTS

| | | |
|---|---|---|
| DE | 10 2006 050 498 B3 | 1/2008 |
| EP | 0 064 742 A2 | 11/1982 |
| JP | 56-138465 A | 10/1981 |
| JP | 61-167175 A | 7/1986 |
| JP | 6-159222 A | 6/1994 |
| NL | 8201303 A | 10/1983 |
| WO | 02/055884 A1 | 7/2002 |
| WO | 2005/040559 A1 | 5/2005 |
| WO | 2007/045244 A1 | 4/2007 |
| WO | WO 2007045244 A1 * | 4/2007 |

* cited by examiner

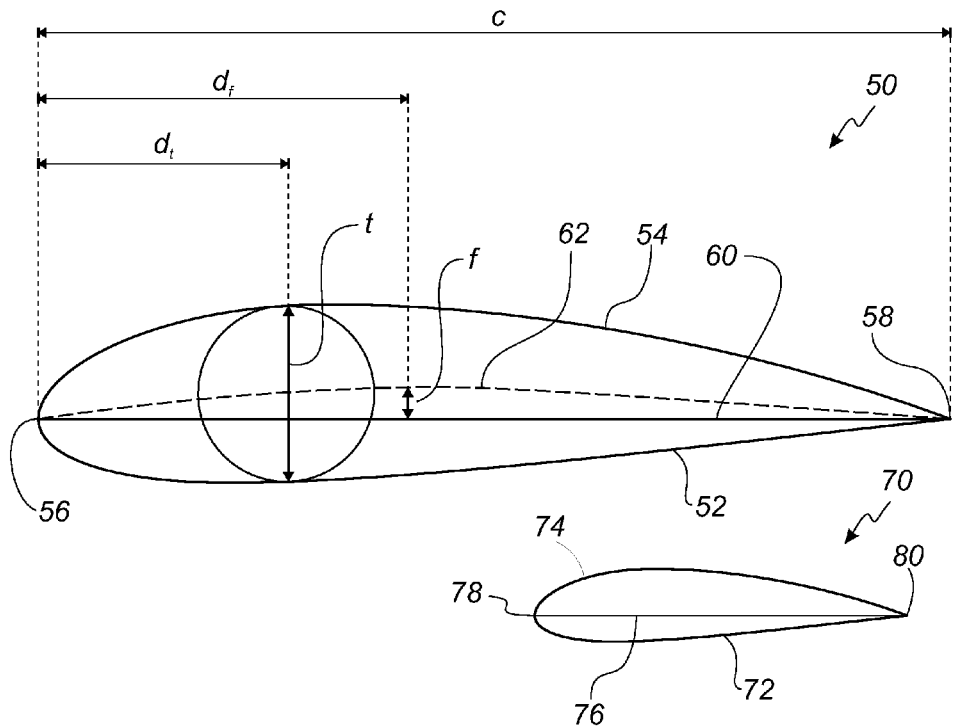
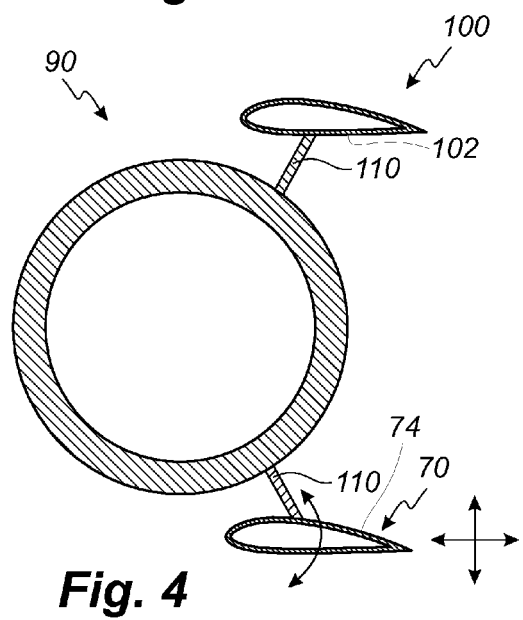
Fig. 3
Fig. 4

WIND TURBINE BLADE WITH AN AUXILIARY AIRFOIL

This is a National Phase Application filed under 35 USC 371 of International Application No. PCT/EP2009/053941, filed on Apr. 2, 2009, an application claiming foreign priority benefits under 35 USC 119 of European Application No. 08388014.6, filed on Apr. 2, 2008, the content of each of which is hereby incorporated by reference in its entirety.

TECHNICAL FIELD

The present invention relates a blade for a rotor of a wind turbine having a substantially horizontal rotor shaft, the rotor comprising a hub, from which the blade extends substantially in a radial direction when mounted to the hub, the blade comprising a main blade part having a profiled contour comprising a pressure side and a suction side as well as a leading edge and a trailing edge with a chord extending between the leading edge and the trailing edge, the profiled contour generating a lift when being impacted by an incident airflow, wherein the profiled contour in the radial direction is divided into a root region comprising a substantially circular or elliptical profile closest to the hub, the substantially circular or elliptical profile having a diameter, an airfoil region with a lift generating profile furthest away from the hub, and a transition region between the root region and the airfoil region, the profile of the transition region gradually changing in the radial direction from the circular or elliptical profile of the root region to the lift generating profile of the airfoil region.

BACKGROUND ART

Ideally, a blade of the airfoil type is shaped like a typical aeroplane wing, where the chord width of the blade as well as the first derivative thereof increase continuously with decreasing distance from the hub. Ideally, the blade is comparatively wide in the vicinity of the hub, resulting in problems when having to mount the blade to the hub. Moreover, the large surface area of the blade near the hub causes large loads, such as storm loads, during use.

Therefore, over the years, the design of modern, wind turbine blades has developed towards a shape, where the blade consists of a root region closest to the hub, an airfoil area furthest away from the hub and a transition area between the root region and the airfoil area. The airfoil area has an ideal or almost ideal blade shape, whereas the root region has a substantially circular or elliptical cross-section, which reduces the extreme loads and makes it easier and safer to mount the blade to the hub. The root region diameter or chord is preferably substantially constant along the entire root region. Due to the circular or elliptical cross-section, the root region does not contribute to the power production of the wind turbine and, in fact, lowers the production because of drag. As is suggested by the name, the transition area has a shape gradually changing from the circular shape of the root region to the airfoil profile of the airfoil area. Typically, the width of the transition area increases substantially linearly with increasing distance from the hub.

As for instance blades for wind turbines have become bigger and bigger in the course of time and may now be more than 60 meters long, the demand for optimised aerodynamic performance has increased. The wind turbine blades are designed to have an operational lifetime of at least 20 years. Therefore, even small changes to the overall performance of the blade may over the lifetime of a wind turbine accumulate to a high increase in economical gains, which surpasses the additional manufacturing costs relating to such changes. The focus areas for research have in many years been directed towards improving the airfoil region of the blade, but during the recent few years, more and more focus has been directed towards improving the aerodynamic performance of the root region and the transition region of the blade also.

It is well known from the aeroplane industry that aeroplanes built with two wings, so called biplanes, normally can lift more than an aeroplane with only one wing. This allows for an increase of the total lift of the wings of the aeroplane without increasing the width of the wings. This principle of using two blades is also known in connection with blades for wind turbines, e.g. by manufacturing wind turbines with two or more rotors. As an example, JP56138465A2 discloses an auxiliary propeller for a wind turbine, where the auxiliary propeller is mounted on the same rotor as a main propeller. The auxiliary propeller has a larger pitch angle than the main propeller, such that the auxiliary propeller accelerates the rotor smoothly at low wind speed, while at high wind speed, the auxiliary propeller decelerates the rotor. Thus the auxiliary propeller works as a speed control system of the rotor.

A similar idea is described in WO 2007/045244 by the present applicant, where the circular root region and the transition region are replaced by two blade segments having a lift-generating airfoil profile.

CA 2 425 447 discloses a wind turbine blade unit comprising two blades disposed in a canard type configuration, i.e. a smaller airfoil arranged in front of a larger airfoil. This configuration provides a passive solution for self-adjusting the pitch angle of the wind turbine blade so as to control the wind turbine rotor hub rotation speed.

WO 02/055884 discloses a rotor for a water turbine or a water pump, the rotor comprising a number of vanes having a main vane blade and a secondary vane blade. The distance between the main vane blade and the secondary vane blade may be adjustable.

None of the cited prior art documents deals with the problem of improving the aerodynamic performance of the actual root region or the transition region of a wind turbine blade according to the afore-mentioned design and particularly not with regards to improving the lift-to-drag ratio of substantially circular, elliptical or oval profiles.

It is an object of the invention to obtain a new blade, which overcomes or ameliorates at least one of the disadvantages of the prior art or which provides a useful alternative.

DISCLOSURE OF INVENTION

The object of the invention is obtained by the blade further comprising a first auxiliary airfoil having a first pressure side and a first suction side as well as a first chord extending between a first leading edge and a first trailing edge, the first chord having a length that is smaller 75% or less of the diameter of the substantially circular or elliptical profile in the root region, the first auxiliary airfoil being arranged so that it extends in the radial direction along at least a part of the root region and/or the transition region of the main blade part with a distance there between. The first auxiliary airfoil may be arranged at the pressure side or the suction side of the main blade part. The auxiliary airfoil reduces the production wise detrimental effects of the sub-optimum aerodynamic design of the root region and/or the transition region. Further, the auxiliary airfoil may be retrofitted to existing blades of a wind turbine already in operation, thus contributing to the overall energy production of a wind turbine.

The pressure side and the suction side at the transition region and the root region are defined from the pressure side and the suction side at the airfoil region, thus the pressure side and the suction side extends (or continues) from the airfoil region into the transition region and the root region. The blade may be twisted, i.e. the chord varies angularly in the radial direction. The distance between the main blade part and the first auxiliary airfoil may vary along the radial direction.

In principle, it may sometimes be difficult to determine where the root region ends and the transition region begins. Thus, when stating that the root region comprises a substantially circular or elliptical profile, it does not exclude that the root region or the transition region also may comprise a substantially oval or egg-shaped profile. Thus, diameter in the context of the present invention means the diameter of the circular profile or the length of the major axis of the elliptical profile or the chord of the profile in the root region.

According to one embodiment, the auxiliary blade extends along substantially the entire radial length of the root section.

The invention also contemplates a blade having a main blade part without a transition region, i.e. a blade part having only the substantially circular or elliptical root region and the airfoil region, and where the first auxiliary airfoil extends along a radial part of the root region only.

In another embodiment according to the invention, the blade is adapted for use in a wind turbine rotor having a direction of rotation during normal operation, and wherein a number of auxiliary airfoils is arranged in the radial direction along at least a part of the root region, so that said number of auxiliary airfoils increase lift and/or decrease drag on the root region and/or the transition region of the main blade part. This can for instance be achieved by arranging the auxiliary airfoils in such a way that the auxiliary airfoils alter and guide the flow around the root region in such a way that the drag is reduced and/or lift is increased. However, the drag on the root region of the main blade part may also increase or even be unchanged for certain flow configurations, especially if the lift is increased.

In another embodiment according to the invention, a number of auxiliary airfoils are arranged in the radial direction along at least a part of the root region so that said number of auxiliary airfoils increases a ratio between a lift coefficient and a drag coefficient for the root region and/or the transition region of the main blade part. Thus, increasing the ratio between the lift coefficient and the drag coefficient, contributes to improving the overall energy production for a wind turbine.

Advantageously, the first auxiliary airfoil extends along at least 50% of a radial extent of the root region of the blade. Thus, the auxiliary airfoil improves the aerodynamic condition of a large part of the root region. The airfoil may also extend along at least 60%, 70% or 75% of the root region.

According to another advantageous embodiment, the first auxiliary airfoil is arranged so that it does not extend into or beyond an outboard part of the transition region, the outboard part corresponding to 25% of the radial extent of the transition region nearest the airfoil region. In other words, the auxiliary airfoil extends at the most along the inner 75% of the transition region, i.e. the part nearest the root region or nearest the hub. According to other embodiments, the outboard part corresponds to 30%, 40%, or 50% of the radial extent of the transition region.

In another embodiment according to the invention, the first chord length is 10-75% of the diameter, or 10-70%, or 10-60% or even 10-50%. The airfoil may be even smaller. Thus, the first chord length may be even 10-40% or 10-30% of the diameter of the root region. Accordingly, the intention of the blade is not to contribute with a high lift in itself but so as to alter and improve the pressure distribution around the root region and/or the transition region of the main blade part.

In another embodiment according to the invention, the first pressure side of the first auxiliary airfoil faces towards the suction side of the main blade part. Thereby, the flow around the main blade part is altered so the lift is increased and the ratio between the lift coefficient and drag coefficient is increased, whereby the aerodynamically efficiency of the blade is improved. Advantageously, the first auxiliary airfoil is arranged near the leading edge of the main blade part, and wherein the first chord of the first auxiliary airfoil, when seen from the leading edge towards the trailing edge of the first auxiliary airfoil is tilted towards the suction side of the main blade part. In another advantageous embodiment, the first auxiliary airfoil is arranged near the trailing edge of the main blade part, wherein the first chord of the first auxiliary airfoil, when seen from the leading edge towards the trailing edge of the first auxiliary airfoil, is tilted towards the pressure side of the main blade part.

In another embodiment according to the invention, the first suction side of the first auxiliary airfoil faces towards the pressure side of the main blade part. Advantageously, the first auxiliary airfoil is arranged near the trailing edge of the main blade part, wherein the first chord of the first auxiliary airfoil, when seen from the leading edge towards the trailing edge of the first auxiliary airfoil, is tilted towards the pressure side of the main blade part.

In another embodiment according to the invention, the first pressure side of the first auxiliary airfoil faces towards the pressure side of the main blade part. Advantageously, the first auxiliary airfoil is arranged near the trailing edge of the main blade part, wherein the first chord of the first auxiliary airfoil, when seen from the leading edge towards the trailing edge of the first auxiliary airfoil, is tilted towards the suction side of the main blade part.

A blade having the first suction side of the first auxiliary airfoil facing toward the suction side of the main blade part is also contemplated, whereby separation can be delayed and drag reduced. Advantageously, the first auxiliary airfoil is arranged near the trailing edge of the main blade part, wherein the first chord of the first auxiliary airfoil, when seen from the leading edge towards the trailing edge of the first auxiliary airfoil, is tilted towards the suction side of the main blade part.

In another embodiment according to the invention, the first auxiliary airfoil extends radially along at least a part of the transition region of the main blade part, thereby also improving this region. According to one embodiment, the first auxiliary airfoil extends along the root section only or alternatively slightly into the transition region.

The root region and transition region typically has a total length corresponding to 10%-20% of the total extent of the blade.

In another embodiment according to the invention, the first auxiliary airfoil extends radially along at least a part of the airfoil region of the main blade part.

In another embodiment according to the invention, the position and/or orientation of the first auxiliary airfoil can be shifted relative to the main blade part. The first auxiliary airfoil and/or the main blade part can be pitched individually or together for instance about a longitudinal axis of the blade. Alternatively they can be translated in the chord direction or in the distance from the root region. Thereby, the relative position of the main blade part and the first auxiliary airfoil may be varied, thereby being able to actively or passively optimise the flow conditions of for instance the root region, for instance based on operating conditions for the rotor.

In another embodiment according to the invention, the first auxiliary airfoil is attached to the main blade part by means of attachment means, such as struts. Together with the attachment means, such as struts, the auxiliary airfoil contributes to strengthening the blade, e.g. by increasing the bending rigidity, and thus stabilising the blade. Thus, as such, the blade may be split into a load carrying part and a flow guiding part.

In another embodiment according to the invention, the first auxiliary airfoil and the main blade part are integrally formed. The first auxiliary airfoil and the main blade part may be formed as a single shell body, which may contribute further to strengthening the blade. However, preferably, the first auxiliary airfoil and the main blade part are separate elements. Thus, the two blade part may be manufactured separately, and the auxiliary airfoil be fitted to the main blade part afterward manufacturing the two blade parts.

In another embodiment according to the invention, the first auxiliary airfoil is twisted along the radial direction. The first auxiliary airfoil may be twisted along the radial direction e.g. about the root section, thus being able to optimise the local differing flow conditions due to the local rotational speed of the blade.

In another embodiment according to the invention, a second auxiliary airfoil is arranged so that it extends in the radial direction along at least a part of the root region of the main part with a distance there between. The second auxiliary airfoil may extend in the radial direction along at least a part of the main blade part with a distance there between. The second auxiliary airfoil may extend radially along at least a part of the root section of the main blade part and/or along at least a part of the transition region of the main blade part. The second auxiliary airfoil can be arranged so either the second pressure side or the second suction side faces towards the pressure or the suction side of the main blade part. The second auxiliary airfoil and/or the main blade part may have individually adjustable pitch angles and the position and/or orientation of the first auxiliary airfoil can be shifted relative to the main blade part. The second auxiliary airfoil may be attached to the main blade part by means of attachment means, such as struts, and/or may be formed integrally with the main blade part. The second auxiliary airfoil may also be twisted along the radial direction.

The invention also contemplates a rotor for a wind turbine comprising a number of blades, preferably two or three, according to any of the aforementioned blades.

The invention also contemplates a wind turbine comprising a number of blades according to any of the aforementioned blades or a rotor according to any of the aforementioned rotors. The wind turbine comprises an upwind rotor and is a high-speed wind turbine. The blades are preferably made from composite material, such as fibre reinforced polymer, and are formed as shell bodies.

The invention is not limited to blades that are specifically designed for use in combination with auxiliary airfoils. One or more auxiliary airfoils could also be retrofitted onto operating blades or blades not designed or intended for use together with auxiliary airfoils.

Thus, according to another aspect, the invention provides a method of retrofitting a first auxiliary airfoil to a wind turbine blade having a profiled contour comprising: a pressure side and a suction side as well as a leading edge and a trailing edge with a chord extending between the leading edge and the trailing edge, the profiled contour generating a lift when being impacted by an incident airflow, wherein the profiled contour in the radial direction is divided into: a root region with a substantially circular or elliptical profile, the substantially circular or elliptical profile having a diameter, an airfoil region with a lift generating profile, and a transition region between the root region and the airfoil region, the profile of the transition region gradually changing in the radial direction from the circular or elliptical profile of the root region to the lift generating profile of the airfoil region. The first auxiliary airfoil is arranged so that it extends in the radial direction along at least a part of the root region and/or the transition region of the main blade part with a distance there between, wherein the first auxiliary airfoil has a first chord having a length that is 75% or less of the diameter of the substantially circular or elliptical profile in the root region.

BRIEF DESCRIPTION OF THE DRAWING

The invention is explained in detail below with reference to an embodiment shown in the drawings, in which FIG. 3 shows a schematic view of an airfoil profile and a first auxiliary airfoil profile according to the invention, FIG. 4 shows a cross sectional view of the root region of a first embodiment according to the invention with a first auxiliary airfoil and a second auxiliary airfoil.

BEST MODES FOR CARRYING OUT THE INVENTION

Figure 1:
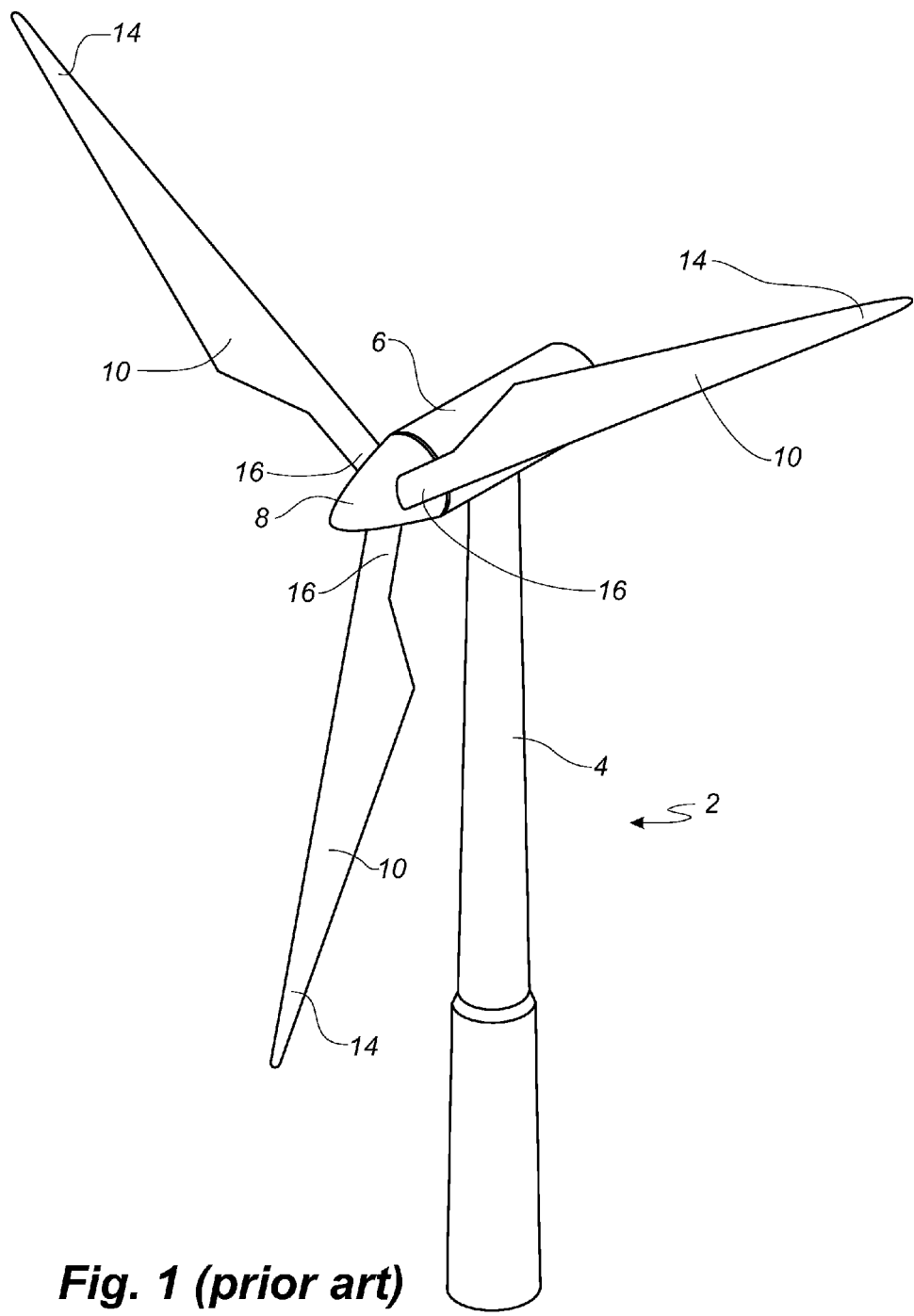
FIG. 1 shows a prior art wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub 8 and a blade tip 14 furthest from the hub 8.

Figure 2:
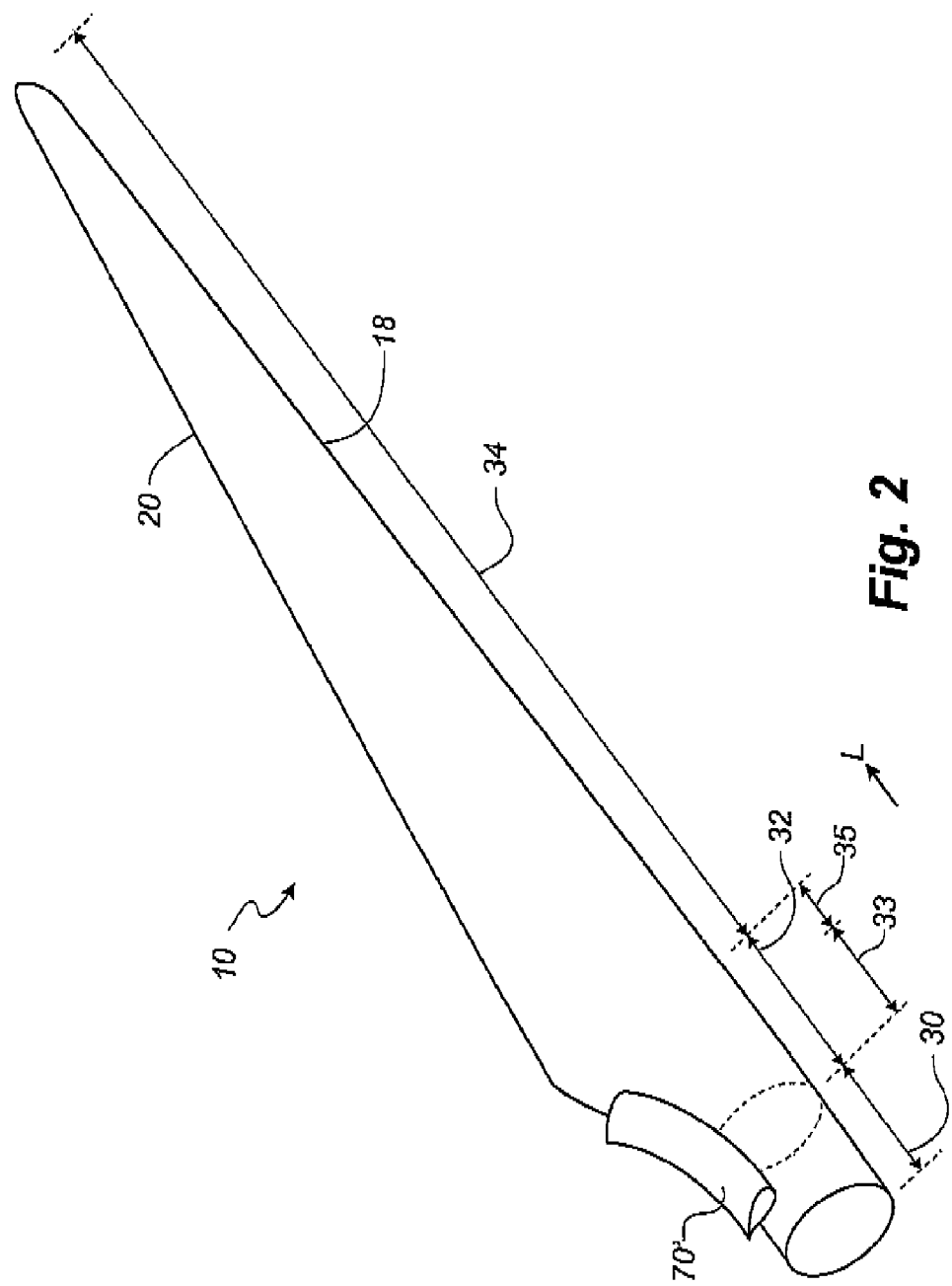
FIG. 2 shows a prior art wind turbine blade.

FIG. 2 shows a schematic view of an embodiment of a wind turbine blade comprising a main blade part. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. FIG. 2 depicts the blade as seen above the suction surface or side covering the airfoil region 34, the transition region 32 and the root region 30, while the pressure surface or side on the opposite side of the blade 10 is hidden.

The airfoil region 34 (also called the profiled region) has an ideal or almost ideal blade shape with respect to generating lift, the root region 30 due to structural considerations having a substantially circular or elliptical cross-section, which for instance makes it easier and safer to mount the blade 10 to the hub. The diameter (or the chord) of the root region 30 is typically constant along the entire root area 30. The transition region 32 has a shape gradually changing from the circular or elliptical shape of the root region 30 to the airfoil profile of the airfoil region 34. The width of the transition region 32 typically increases substantially linearly with increasing distance L from the hub.

The airfoil region 34 has an airfoil profile with a chord extending between the leading edge 18 and the trailing edge 20 of the blade 10. The width of the chord decreases with increasing distance L from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

An auxiliary airfoil 70' is arranged along the root region 30 of the main blade part and an inboard part 33 of the transition region 32. Thus, the auxiliary airfoil 70' does not extend into or beyond an outboard part 35 of the transition region 32. The outboard part may for instance extend along 25% of the total radial extent of the transition region 32. The auxiliary airfoil 70' alters and improves the pressure distribution around the root region 30 and the inboard part 33 of the transition region 32 in order to increase the power production of a wind turbine utilising such blades and auxiliary airfoils.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face the windward side and the leeward side, respectively. The airfoil 50 has a chord 60 with a chord length c extending between a leading edge 56 and a trailing edge 58 of the blade. The airfoil profile 50 has a thickness t, which is defined as the distance between the pressure side 52 and the suction side 54. The thickness t of the airfoil profile 50 varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c.

FIG. 3 also shows a first auxiliary airfoil profile 70 with a first pressure side 72, a first suction side 74 and a first chord 76 extending between a first leading edge 78 and a first trailing edge 80. In this embodiment the auxiliary airfoil 70 is facing the pressure side 52 of the blade. However, the embodiment is meant as example only in order to define the different parameters of the main blade part and the auxiliary airfoil, as the auxiliary airfoil preferably extends along the root region and the transition region of the blade.

Figure 11:
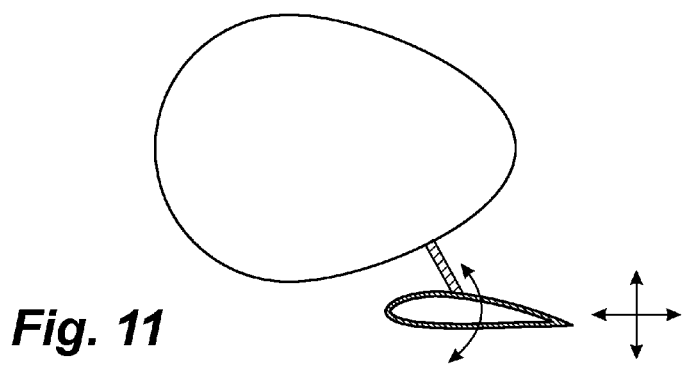
FIG. 11 shows a cross sectional view of an egg-shaped profile with a first auxiliary airfoil and a second auxiliary airfoil.

In the following with reference to FIGS. 4-8 a number of different embodiments are described with respect to a circular profile. However, the auxiliary airfoils may also be arranged at the similar positions of substantially elliptical, oval, or egg-shaped profiles as shown in FIG. 11. In all the embodiments shown in FIGS. 4-8 and FIG. 11, the inflow direction of an incident airflow is from the left towards the right side of the figures.

FIG. 4 shows a cross section through a blade according to the invention. A first auxiliary airfoil 70 and a second auxiliary airfoil 100 are mounted to a root region 90 having a circular profile via attachment means 110. The attachment means 110 in FIG. 4 are shown as struts; however these attachment means 110 may be constructed in many ways. As illustrated in FIG. 4, the first auxiliary airfoil 70 may shift orientation relative to the root region profile 90. The second auxiliary airfoil 100 in FIG. 4 may also shift orientation relative to the root region profile 90. In this embodiment the first suction side 74 of the first auxiliary airfoil 70 is facing the root region profile 90, while a first pressure side 102 of the second auxiliary airfoil 100 is facing the root region profile 90. The first auxiliary airfoil 70 and the second auxiliary airfoil 100 alters the flow around the root region profile 90 such that the overall aerodynamic efficiency is improved, mainly by generating lift and/or reducing drag by altering the pressure distribution around the root region 90 in order to increase the lift component, e.g. by delaying separation and reducing drag. Further, the lift from the auxiliary airfoils may increase the overall lift.

However, the auxiliary airfoils can also improve the pressure distribution around substantially elliptical, oval, or egg-shaped profiles as shown in FIG. 11.

Figure 5:
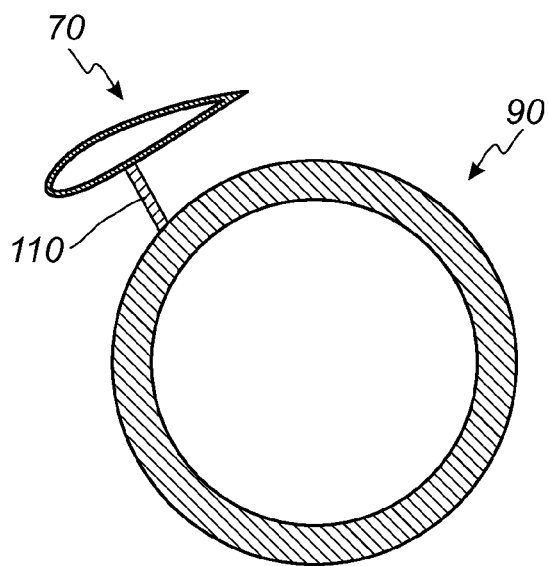
FIG. 5 shows a cross sectional view of the root region of a second embodiment according to the invention with a first auxiliary airfoil.

In the embodiment shown in FIG. 5 a first auxiliary airfoil with a first auxiliary airfoil profile 70 is mounted to the blade by an attachment means 110 in such a way, that the pressure side of the first auxiliary airfoil is facing the suction side 54 of the root region 90. The auxiliary airfoil alters the flow around the root region profile 90. According to other embodiments, the angle of attack of the auxiliary airfoil may be lower, and/or the position of the auxiliary airfoil may be shifted towards the leading edge of the root region profile 90.

Figure 6:
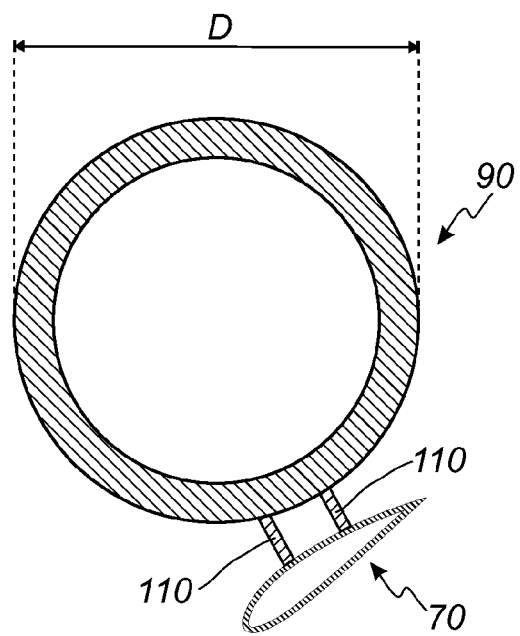
FIG. 6 shows a cross sectional view of the root region of a third embodiment according to the invention with a first auxiliary airfoil.

In the embodiment shown in FIG. 6 a first auxiliary airfoil with a first auxiliary airfoil profile 70 is mounted to the blade by two attachment means 110 in such a way, that the suction side of the first auxiliary airfoil is facing the pressure side 52 of the root region profile 90. The auxiliary airfoil alters the flow around the root region profile 90.

Figure 7:
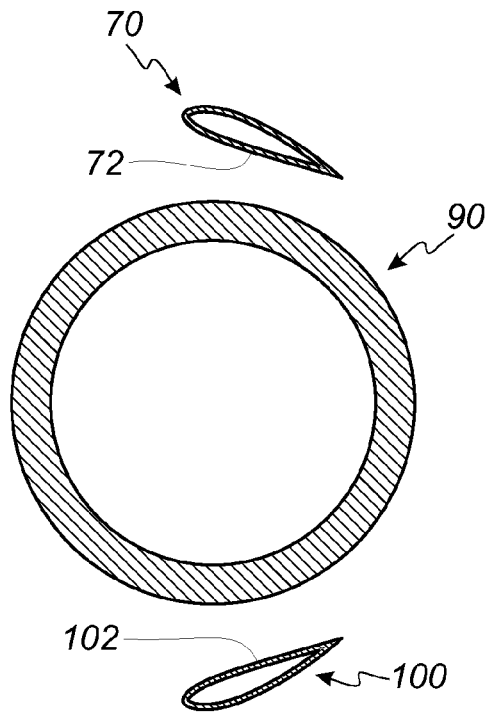
FIG. 7 shows a cross sectional view of the root region of a fourth embodiment with a first auxiliary airfoil and a second auxiliary airfoil according to the invention.

In the embodiment shown in FIG. 7 a first auxiliary airfoil with a first auxiliary airfoil profile 70 is arranged in such a way that the first pressure side 72 of the first auxiliary airfoil is facing the suction side 54 of the root region 90. Furthermore, a second auxiliary airfoil with a second auxiliary airfoil profile 100 is arranged in such a way that the second pressure side of the second auxiliary airfoil is facing the pressure side 52 of the root region profile 90. The first auxiliary airfoil and the second auxiliary airfoil in combination alter the flow around the root region profile 90, such that drag is lowered by reducing the separation of airflow in the region between the auxiliary airfoils.

Figure 8:
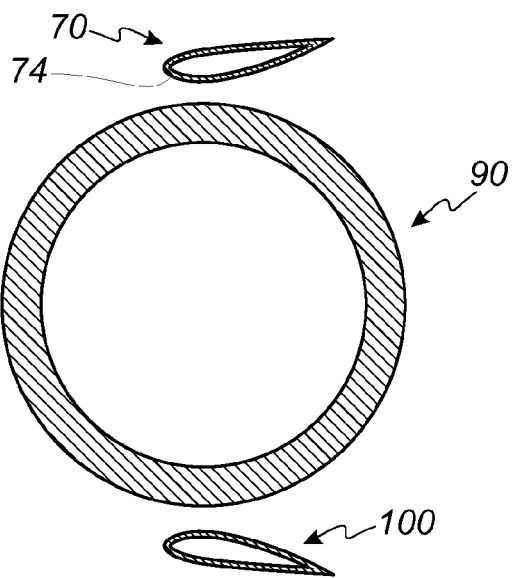
FIG. 8 shows a cross sectional view of the root region of a fifth embodiment with a first auxiliary airfoil and a second auxiliary airfoil according to the invention.

In the embodiment shown in FIG. 8 a first auxiliary airfoil with a first auxiliary airfoil profile 70 is arranged in such a way, that the first suction side 74 of the first auxiliary airfoil is facing the suction side 54 of the root region 90. Furthermore, a second auxiliary airfoil with a second auxiliary airfoil profile 100 is arranged in such a way that the second suction side of the second auxiliary airfoil is facing the pressure side 52 of the root region profile 90. The first auxiliary airfoil and the second auxiliary airfoil in combination alter the flow around the root region profile 90, such that drag is lowered by reducing the separation of airflow in the region between the auxiliary airfoils.

Figure 9:
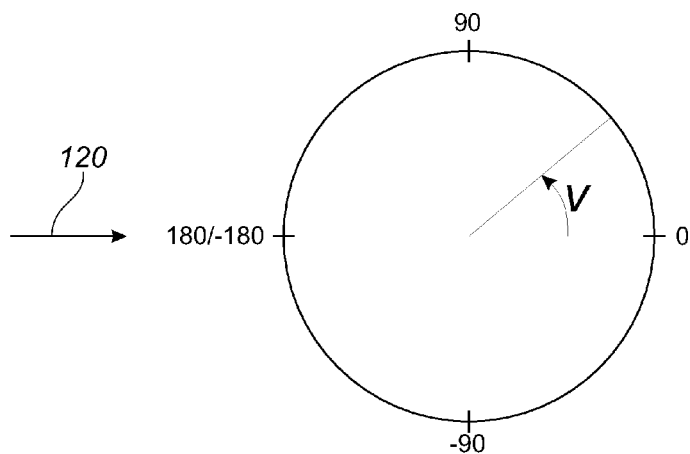
FIG. 9 shows a schematic view of a flow around a cylinder.
Figure 10:
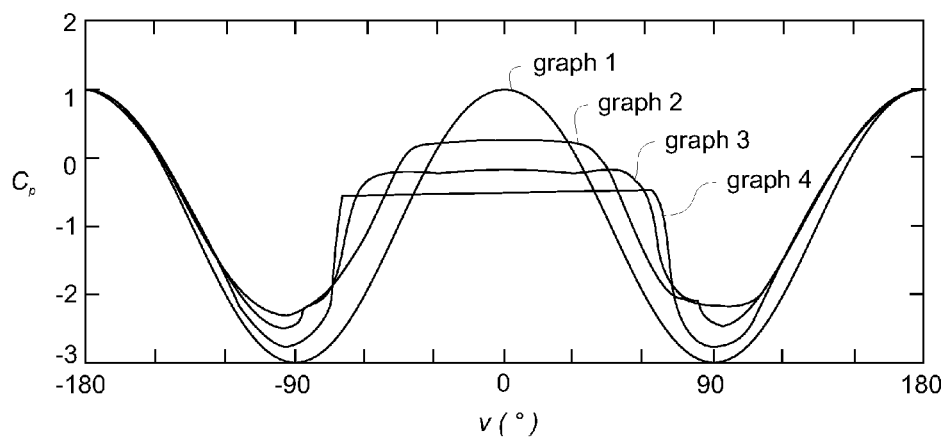
FIG. 10 shows graphs of a pressure coefficient distribution for flow around a cylinder for different configurations.

FIG. 9 shows a schematic view of a flow around a circular profile, where an angle v is defined. In FIG. 10 graph 1 and graph 3 show the pressure coefficient distributions as a function of v for flow around the circular profile, where graph 1 is a theoretically obtained inviscid solution of the flow and graph 3 is an experimental result for flow with a supercritical Reynolds number. Graph 2 shows the pressure coefficient distribution as a function of v for flow around a circular profile with two auxiliary airfoils arranged so the configuration corresponds to the configuration shown in FIG. 7, while graph 4 shows the pressure coefficient distribution as a function of v for flow around a circular profile with two auxiliary airfoils arranged so the configuration corresponds to the configuration shown in FIG. 8.

The pressure coefficient distribution shown in graph 1 is spatially periodic, resulting in zero drag of the circular profile, since there is no pressure difference and hence no pressure loss as seen in the flow direction 120. However, in reality, drag occurs for a flow around a circular profile due to a boundary layer separation. The amount of drag can be lowered by delaying the boundary layer separation, thus having the point of boundary layer separation shifted towards v=0°. An important factor for triggering the boundary layer separation is the pressure gradient. Thus, a high pressure gradient will trigger boundary layer separation faster than a lower pressure gradient.

The first derivative of each graph 1-4, shown in FIG. 10, corresponds to a pressure gradient; a high first derivative in absolute number thus corresponds to a high pressure gradient which leads to a faster boundary layer separation. This effect can be seen by considering graphs 1 to 4, where a high pressure gradient (steep slope) leads to a pressure coefficient plateau in the interval −60°<v<60°, which is lower than the pressure coefficient plateau in the interval −60°<v<60° for graphs with a lower pressure gradient. The lower the pressure coefficient plateau in the interval −60°<v<60°, the larger the overall pressure difference or drag. As seen in FIG. 10, one of the configurations with the circular profile combined with two auxiliary airfoils (graph 2) yields a lower drag than the drag measured experimentally on the circular profile alone (graph 3). This clearly indicates that the auxiliary airfoils in this embodiment increase the overall aerodynamically efficiency.

The invention has been described with reference to a preferred embodiment. However, the scope of the invention is not limited to the illustrated embodiment, and alterations and modifications can be carried out without deviating from the scope of the invention. For instance, the orientation of the two auxiliary airfoils as shown in FIG. 4, FIG. 7, and FIG. 8, may be adjustable relative to the root section, thereby being able to alter the direction of the wake.

REFERENCE NUMERALS 2 wind turbine
4 tower
6 nacelle
8 hub
10 blade
14 blade tip
16 blade root
18 leading edge
20 trailing edge
30 root region
32 transition region
33 inboard part of transition region
34 airfoil region
35 outboard part of transition region
50 airfoil profile
52 pressure side
54 suction side
56 leading edge
58 trailing edge
60 chord
62 camber line/median line
70 first auxiliary airfoil profile
72 first pressure side
74 first suction side
76 first chord
78 first leading edge
80 first trailing edge
90 root region profile
100 second auxiliary airfoil profile
102 first pressure side
110 attachment means
120 flow direction

The invention claimed is:

1. A blade (10) for a rotor of a wind turbine (2) having a substantially horizontal rotor shaft, the rotor comprising a hub (8), from which the blade (10) extends substantially in a radial direction when mounted to the hub (8), the blade (10) comprising a main blade part having:
    a profiled contour (50) comprising a pressure side (52) and a suction side (54) as well as a leading edge (56) and a trailing edge (58) with a chord (60) extending between the leading edge (56) and the trailing edge (58), the profiled contour (50) generating a lift when being impacted by an incident airflow, wherein the profiled contour (50) in the radial direction is divided into:
    a root region (30) consisting of a substantially circular or elliptical profile (90) closest to the hub (8), the substantially circular or elliptical profile (90) along the entire root region having a diameter (D),
    an airfoil region (34) with a lift generating profile furthest away from the hub (8), and
    a transition region (32) between the root region (30) and the airfoil region (34), the profile of the transition region (32) gradually changing in the radial direction from the circular or elliptical profile (90) of the root region (30) to the lift generating profile of the airfoil region (34), characterized in that the blade (10) further comprises:
    a first auxiliary airfoil (70) having a first pressure side (72) and a first suction side (74) as well as a first chord (76) extending between a first leading edge (78) and a first trailing edge (80), the first chord (76) having a length that is 75% or less of the diameter (D) of the substantially circular or elliptical profile (90) in the root region (30),
    the first auxiliary airfoil (70) being arranged so that it extends in the radial direction along at least a part of the root region (30) and/or the transition region (32) of the main blade part with a distance there between.

2. The blade (10) according to claim 1, wherein the blade (10) is adapted for use in a wind turbine rotor having a direction of rotation during normal operation, and wherein a number of auxiliary airfoils (70, 100) is arranged in the radial direction along at least a part of the root region (30) and adapted so as to alter and guide the incident airflow so as to increase lift and/or decrease drag on the root region (30) and/or the transition region (32) of the main blade part.

3. The blade (10) according to claim 1, wherein a number of auxiliary airfoils (70, 100) is arranged in the radial direction along at least a part of the root region (30) and adapted so as to alter and guide the incident airflow so that the ratio between a lift coefficient and a drag coefficient for the root region (30) and/or the transition region (32) of the main blade part is increased.

4. The blade according to claim 1, wherein the first auxiliary airfoil (70) extends along at least 50% of a radial extent of the root region (30) of the blade.

5. The blade according to claim 1, wherein the first auxiliary airfoil (70) is arranged so that it does not extend into or beyond an outboard part of the transition region (32), the outboard part corresponding to 25% of the radial extent of the transition region (32) nearest the airfoil region (34).

6. The blade (10) according to claim 1, wherein the first auxiliary airfoil (70) extends along the root region (30) of the blade only.

7. The blade (10) according to claim 1, wherein the first chord length being 10-75% of the diameter (D), or 10-70%, or 10-60% or even 10-50%.

8. The blade (10) according to claim 1, wherein the first pressure side (72) of the first auxiliary airfoil (70) faces towards the suction side (54) of the main blade part.

9. The blade (10) according to claim 1, wherein the first suction side (74) of the first auxiliary airfoil (70) faces towards the pressure side (52) of the main blade part.

10. The blade (10) according to claim 1, wherein the first pressure side (72) of the first auxiliary airfoil (70) faces towards the pressure side (52) of the main blade part.

11. The blade (10) according to claim 1, wherein the position and/or
orientation of the first auxiliary airfoil (70) can be shifted relative to the main blade part.

12. The blade according to claim 1, wherein the first auxiliary airfoil (70) is attached to the main blade part by means of attachment means (110), such as struts.

13. The blade (10) according to claim 1, wherein the first auxiliary airfoil (70) is twisted along the radial direction.

14. The blade (10) according to claim 1, wherein a second auxiliary airfoil (100) is arranged so that it extends in the radial direction along at least a part of the root region (30) and/or the transition region (32) of the main part with a distance there between.

15. A wind turbine (2) including a rotor comprising a number of blades (10), preferably two or three, according to claim 1.

16. A method of retrofitting a first auxiliary airfoil to a wind turbine blade having a profiled contour comprising:
a pressure side and a suction side as well as a leading edge and a trailing edge with a chord extending between the leading edge and the trailing edge, the profiled contour generating a lift when being impacted by an incident airflow, wherein the profiled contour in the radial direction is divided into:
a root region with a substantially circular or elliptical profile, the substantially circular or elliptical profile having a diameter along the entire root region,
an airfoil region with a lift generating profile, and
a transition region between the root region and the airfoil region, the profile of the transition region gradually changing in the radial direction from the circular or elliptical profile of the root region to the lift generating profile of the airfoil region, characterized by
arranging the first auxiliary airfoil so that it extends in the radial direction along at least a part of the root region and/or the transition region of the main blade part with a distance there between, and wherein the first auxiliary airfoil has a first chord having a length that is 75% or less of the diameter of the substantially circular or elliptical profile in the root region.

* * * * *